United States Patent
Haupt et al.

(10) Patent No.: US 7,461,156 B2
(45) Date of Patent: Dec. 2, 2008

(54) METHOD FOR DETERMINING A TIMEOUT DELAY IN A NETWORK

(75) Inventors: Dieter Haupt, Springe (DE); Gilles Straub, Acigné (FR)

(73) Assignee: Thomson Licensing, Boulogne Billancourt (FR)

( * ) Notice: Subject to any disclaimer, the term of this patent is extended or adjusted under 35 U.S.C. 154(b) by 671 days.

(21) Appl. No.: 10/399,273

(22) PCT Filed: Oct. 18, 2001

(86) PCT No.: PCT/EP01/12331

§ 371 (c)(1),
(2), (4) Date: Apr. 16, 2003

(87) PCT Pub. No.: WO02/33907

PCT Pub. Date: Apr. 25, 2002

(65) Prior Publication Data

US 2004/0044801 A1 Mar. 4, 2004

(30) Foreign Application Priority Data

Oct. 19, 2000 (EP) .................................. 00402900

(51) Int. Cl.
*G06F 15/16* (2006.01)
(52) U.S. Cl. ..................... 709/228; 709/236; 710/117; 710/118
(58) Field of Classification Search ......... 710/117–118; 709/228, 236
See application file for complete search history.

(56) References Cited

U.S. PATENT DOCUMENTS

| 5,793,976 | A | | 8/1998 | Chen et al. ............. 395/200.54 |
| 6,032,261 | A | * | 2/2000 | Hulyalkar .................. 713/400 |
| 6,370,369 | B1 | * | 4/2002 | Kraiem et al. ........... 455/277.1 |
| 6,614,350 | B1 | * | 9/2003 | Lunsford et al. ......... 340/572.1 |
| 6,728,809 | B1 | * | 4/2004 | Suzuki et al. ............... 710/118 |
| 7,020,725 | B2 | * | 3/2006 | Burdin et al. ............... 710/200 |
| 7,027,418 | B2 | * | 4/2006 | Gan et al. .................... 370/329 |
| 2003/0126332 | A1 | * | 7/2003 | Toguchi et al. .............. 710/118 |
| 2004/0057411 | A1 | * | 3/2004 | Straub et al. ................ 370/338 |

OTHER PUBLICATIONS

Daivd V. James: "Wireless Hiperlan-2 Layer", P1394.1 Draft Standard for High Performance Serial Bus Bridges, IEEE, New York, NY Oct. 12, 1999, Working Group p13941.

* cited by examiner

*Primary Examiner*—John Follansbee
*Assistant Examiner*—Saket K Daftuar
(74) *Attorney, Agent, or Firm*—Joseph J. Laks; Paul P. Kiel

(57) ABSTRACT

A method for determining a remote timeout parameter in a network comprising a link between a first bus and a third bus. The link is implemented through a first and a second bridge portal connected respectively to the first and the third bus, and is modelized as a second bus connected to the first bus and the third bus through bridges. Upon solicitation to provide its contribution to a timeout for a request subaction, the first bridge portal adds to the timeout contribution the first bridge portal's maximum request subaction processing time and either the link's maximum transmission time of half of the link's maximum transmission time, depending on the location of the destination node of the request subaction.

10 Claims, 1 Drawing Sheet

METHOD FOR DETERMINING A TIMEOUT DELAY IN A NETWORK

This application claims the benefit, under 35 U.S.C. § 365 of International Application PCT/EP01/12331, filed Oct. 18, 2001, which was published in accordance with PCT Article 21(2) on Apr. 25, 2002 in English and which claims the benefit of European patent application No. 00402900.5, filed Oct. 19, 2000.

FIELD OF THE INVENTION

The invention concerns a method for determining a timeout delay in a communication network, in particular a network comprising a link connecting two IEEE 1394 busses. The link may for example be a wireless Hiperlan 2 link.

BACKGROUND ART

The response timeout problem has been treated as follows in a number of standards or draft standards:

(a) Situation in a Wired IEEE1394-1995 Bus Environment:

A split transaction is characterized by a request subaction and a subsequent responder subaction using the same transaction label (i.e. an identifier of the transaction).

A value in the SPLIT_TIMEOUT control and status register specifies a maximum time period for a particular IEEE1394 node, in which the response to a request has to be generated and sent. If the specified time period (or twice the time period as specified in the IEEE1394a standard respectively) has elapsed without a response being transmitted, the complete transaction fails and the transaction label can be reused ("recycled") by the requesting node.

Reference: *IEEE Standard for a High Performance Serial Bus* (IEEE 1394-1995), IEEE New York, 1996

*IEEE Standard for a High Performance Serial Bus—Amendment* 1 (IEEE1394A-2000), IEEE New York, 2000

(b) Situation in the BRAN Hiperlan 21394 SSCS

The BRAN Hiperlan 2 IEEE1394 Service Specific Convergence technical specification describes how a Hiperlan 2 (HL2) link can be modeled as a virtual IEEE 1394 bus. Therefore, a HL2 split timeout is defined in a fashion similar to an IEEE Std 1394-1995 split timeout, but with a 200 ms default value instead of 100 ms.

An algorithm at the sending portal defines, with help of this SPLIT_TIMEOUT value, a time_of_life period for each particular asynchronous request or response intended to be transmitted over the HL2 wireless link. The time_of_life parameter will be converted to a time_of_death label attached to each asynchronous packet. This time_of_death label advises the receiver of this packet on the wireless link to discard it, if its intended end of life has been reached. The format of the SPLIT_TIMEOUT register defined by the SSCS document differs slightly from the specifications IEEE 1394-1995 and IEEE 1394a-2000.

Reference: IEEE 1394 Service Specific Convergence Sublayer (DTS/BRAN-00240004-3 V1.1.1), ETSI Project Broadband Radio Access Networks (BRAN), Sophia Antipolis, September 2000

(c) Proposed Situation in the IEEE P1394.1 Bridge Environment

Due to longer transmission delays in a bridge environment, this easy split_timeout mechanism cannot be used anymore if split transactions are intended to pass bridges between busses. Instead of the 'split_timeout' parameter, a 'remote_timeout' parameter is defined.

The 'remote_timeout' parameter in an IEEE P1394.1 bridge environment can be determined by sending a message called a TIMEOUT bridge management message with a particular 'timeout' opcode to a virtual node identifier. The virtual node identifier represents the destination node which, since it is not on the same bus as the requesting node, does not have a physical identifier on the bus of the requesting node. In the response to this packet, the requesting node will receive the accumulated maximum delay times of all intermediate bridges.

The draft IEEE P1394.1 distinguishes different delay times in a bridge for requests (MAX_RQ_FORWARD_TIME) and responses (MAX_RESP_FORWARD_TIME). These times are implementation dependent and have to be provided by the manufacturer of the bridge.

A description of the 'TIMEOUT bridge management message' is given in section 6.7 of P1394.1 Draft D 0.11. Section 4.2 also describes the overall process.

Reference: IEEE Draft Standard for High Performance Serial Bus Bridges (IEEE P1394.1 Vers. 0.11) IEEE 1391.1 working group (standard not yet approved)

BRIEF SUMMARY OF THE INVENTION

Accordingly, the problem to solve is the following:

When a link such as a HL2 network is represented as an IEEE 1394 bus, a HL2 wireless bridge is used to wirelessly interconnect IEEE 1394 bridge aware nodes. When two bridge aware nodes exchange asynchronous packets over HL2, they cross two bridges. Therefore they have to use a remote timeout that takes into account the two wireless bridges as well as the HL2 transmission time.

Note that the term 'link' designates any appropriate configuration of a wireless (or wired) network, not simply a point-to-point link.

The invention concerns a method for determining a remote timeout parameter in a network comprising a link between a first bus and a third bus, wherein the link is implemented through a first and a second portal connected respectively to the first and the third bus, and wherein the link is modelized as a second bus connected to the first bus and the third bus through respective bridges;

the method comprising the steps, at the level of the first bridge portal of, upon solicitation to provide its contribution to a timeout for a request subaction:

(a) determining whether a destination node of the request subaction is located on the link or not;

(b) in the affirmative, adding to the timeout contribution: the first bridge portal's maximum request subaction processing time and link's maximum transmission time;

(c) in the negative, adding, to the timeout contribution: the first bridge portal's maximum request subaction processing time and half of the link's maximum transmission time.

When asked to specify its contribution to a timeout interval regarding a future request subaction, a portal checks whether the destination node of the request subaction lies on the wireless link or not. Depending on the answer to this question, the portal decides whether to contribute, in addition to its own processing or forwarding time, half or all of the link maximum transmission time. Indeed, only half of the maximum transmission time is added if it is expected that the request subaction will be forwarded (or came from) the peer portal which will contribute (or has already contributed) the other half of this maximum transmission time. The process above concerns determination of timeout contribution for request subactions. A symmetric approach applies to response subactions.

Other characteristics and advantages of the invention will appear through the description of a preferred embodiment of the invention, explained with the help of the unique drawing representing a diagram of the network of the present embodiment, including the different timeout contributions The process for a timeout response message is symmetric.

DEAILED DESCRIPTION OF THE INVENTION

Figure 1:
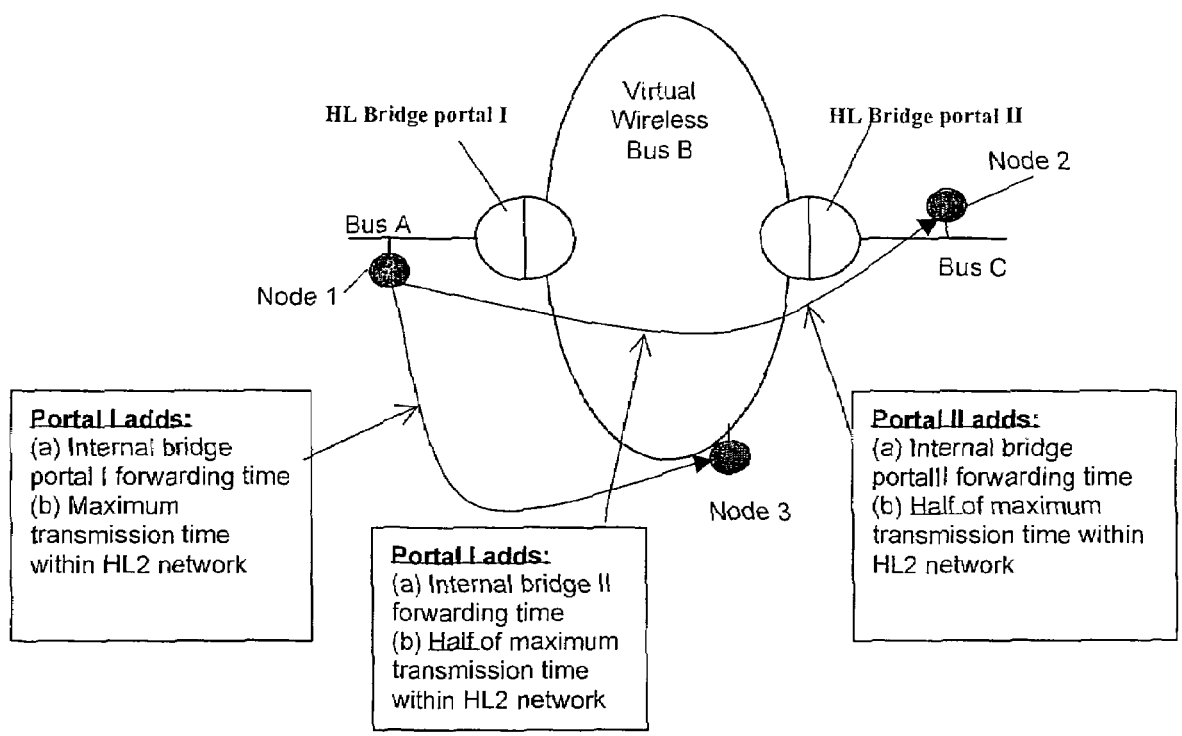
FIG. 1 illustrates two buses linked by a Hiperlan network via bridge portals.

The Timeout handling of Hiperlan 2 Bus Bridges according to the invention is carried out as follows:

As illustrated by FIG. 1, Hiperlan bus bridges usually have one portal connected to a wired IEEE1394 bus, the other portal being connected to a wireless Hiperlan 2 network. To achieve compatibility to P1394.1 bridges, Hiperlan 2 bridges must be able to process the Timeout Bridge Management Message mentioned in the introduction.

Note that the invention could also be applied in other contexts than that of FIG. 1. In particular, the link is not necessarily a wireless link.

For this reason it is necessary that each Hiperlan 2 compliant bus bridge provide values for the MAX_RQ_FORWARD_TIME and MAX_RESP_FORWARD_TIME parameters of the timeout message.

The MAX_RQ_FORWARD_TIME parameter represents the sum of time limits that each bridge on the route from a requesting node to a destination node is allotted within which to forward a request subaction to the next bridge. Similarly, the MAX_RESP_FORWARD_TIME parameter represents the sum of time limits for a response subaction. These two times may be different.

The following method describes how these MAX_RQ_FORWARD_TIME and MAX_RESP_FORWARD_TIME values are calculated.

Two cases are considered:

(1) a wired bridge aware device sends packets to a HL2 wireless device connected to the HL2 'bus', or (2) a wired bridge aware device sends packets to another wired bridge aware device over the HL2 bus.

(1) Sending Packets to a Wireless Device

When a bridge aware device (e.g. node 1) sends a request subaction packet to a HL2 device (e.g. node 3), it will experience following delays:

Wireless bridge 1 internal request forwarding time (basically the processing time of the internal switching fabric)

transmission time within the Hiperlan 2 network

Similarly when a bridge aware device (e.g. node 1) sends a response subaction packet to a HL2 device (e.g. node 3), it will experience following delays:

Wireless bridge 1 internal response forwarding time (basically the processing time of the internal switching fabric)

transmission time within the Hiperlan 2 network (identical to the HL2 request subaction transmission time)

(2) Sending Packets to a Wired Device over HL2

When a wired bridge aware device (e.g. node 1) sends a request subaction packet to another wired bridge aware device (e.g. node 2) over HL2, it will experience following delays:

Wireless bridge 1 internal request forwarding time (basically the processing time of the internal switching fabric)

transmission time within the Hiperlan 2 network

Wireless bridge 2 internal request forwarding time

Similarly when a wired bridge aware device (e.g. node 1) sends a response subaction packet to another wired bridge aware device (e.g. node 2) over HL2, it will experience following delays:

Wireless bridge 1 internal response forwarding time (basically the processing time of the internal switching fabric)

transmission time within the Hiperlan 2 network (identical to the HL2 request subaction transmission time)

Wireless bridge 2 internal response forwarding time

The following mechanism is proposed:

1/ When a wireless bridge gets a TIMEOUT request message (bridge management message with opcode=TIMEOUT, q=REQUEST), it checks the destination_id field of the TIMEOUT bridge management message.

If the destination_id.bus_id field is the HL2 bus bus_id, then the wireless bridge shall increase the max rq_hold_seconds and max_rq_hold_cycles fields with its own MAX_RQ_FORWARD_TIME plus the HL2 maximum transmission time (½ HL2 $T_{st}$=100 ms). $T_{st}$ is the SPLIT_TIMEOUT register value. On HL2 it is set to 200 ms (1394 SSCS TS).

The bridge portal also sets the 'remote_split_timeout_seconds' and 'remote_split_timeout_cycles' fields of the TIMEOUT request message to the corresponding HL2 SPLIT_TIMEOUT values, since the HL2 bus is the destination bus. These values correspond to the time interval during which the bridge will wait for the response from the wireless destination device.

If the destination_id.bus_id field is not the HL2 bus bus_id (i.e. the destination_id is on the other side of the wireless network), then the wireless bridge shall increase the max_rq_hold_seconds and max_rq_hold_cycles fields with its own MAX_RQ_FORWARD_TIME plus half of the HL2 maximum transmission time (½(½ HL2 $T_{st}$)=50 ms). Then the TIMEOUT request message is sent to the next wireless bridge (which will perform a similar processing, so that at the end of the wireless transmission the TIMEOUT request message accumulated both bridge MAX_RQ_FORWARD_TIME plus the HL2 maximum transmission time).

Similarly:

2/ When a wireless bridge gets a TIMEOUT response message (bridge management message with opcode=TIMEOUT, q=RESPONSE), it shall check the destination_id field of the TIMEOUT bridge management message (see 6.4 of D0.11).

If the destination_id.bus_id field is the HL2 bus bus_id, then the wireless bridge shall increase the max_resp_hold_seconds and max_resp_hold_cycles fields with its own MAX_RESP_FORWARD_TIME plus the HL2 maximum transmission time (½ HL2 $T_{st}$=100 ms)

If the destination_id.bus_id field is not the HL2 bus bus_id (i.e. the destination_id is on the other side of the wireless network), then the wireless bridge shall increase the max resp_hold_seconds and max resp_hold_cycles fields with its own MAX_RESP_FORWARD_TIME plus half of the HL2 maximum transmission time (½ (½ HL2 $T_{st}$)=50 ms). Then the TIMEOUT response message is sent to the next wireless bridge (which will perform a similar processing, so that at the end of the wireless transmission the TIMEOUT response message accumulated both bridge MAX_RESP_FOR-WARD_TIME plus the HL2 maximum transmission time).

In summary, for asynchronous traffic between a wired 1394 bus A over a first Hiperlan 2 bus bridge I, a wireless Hiperlan 2 network B, a second Hiperlan 2 bus bridge II and a wired 1394 bus C, the HL bridge I will add the first half, the HL bridge II will add the second half to the maximum transmission delay of the wireless bus B. For asynchronous traffic between a wired 1394 bus A device and a HL2 bus device over a wireless bridge I, the HL bridge I will add the whole maximum transmission delay of the wireless bus B to its own internal maximum forward time.

By the adding the maximum transmission delay to maximum forward times, it is possible to hide the special properties of a wireless network to bridge aware node. In this case it will see no differences if its request is routed via a wired, IEEE1394.1 compliant bridge or via a Hiperlan 2 bridge.

The embodiment enables bridge aware nodes to work seamlessly over HL2 bridges using only P1394.1 bridge-command mechanisms.

The invention claimed is:

1. Method for facilitating data transmission over a network by determining a remote timeout parameter in a network comprising a link comprising the steps, at a level of a first bridge portal, upon solicitation to provide its timeout contribution for a request subaction, of:
   (a) determining whether a destination node of the request subaction is located on the link or not, wherein the link represents a second bus that is between a first bus and a third bus, wherein the link is implemented through a first and a second bridge portal connected respectively to the first and the third bus, and wherein the link is modelized as the second bus connected to the first bus and the third bus through respective bridges;
   (b) if a destination node of the request subaction is located on the link representing the second bus, adding to the timeout contribution: the first bridge portal's maximum request subaction processing time and the link's maximum transmission time, wherein the timeout represents the sum of time limits that each bridge on a route from a requesting node to a destination node is allotted to forward the request subaction, the requesting node being on the first bus, the destination node being on the link representing the second bus or on the third bus;
   (c) if a destination node of the request subaction is not located on the link representing the second bus, adding to the timeout contribution: the first bridge portal's maximum request subaction processing time and half of the link's maximum transmission time; and
   (d) deeming a data transmission attempt a failure if the request subaction does not occur within a time interval defined by the timeout contribution.

2. Method according to claim 1, wherein, further to step (c), the second bridge portal adds, as its contribution, its own maximum request subaction processing time and half of the link's maximum transmission time.

3. Method according to claim 1, wherein the link representing the second bus is a Hiperlan 2 wireless network.

4. Method according to claim 3, wherein the maximum transmission time of the wireless link representing the second bus is equal to half of the Hiperlan 2 IEEE 1394 SSCS 'SPLIT_TIMEOUT' register value of a portal.

5. Method according to claim 1, wherein the timeout contribution from the bridges is solicited through a timeout request message.

6. Method according to claim 5, wherein, further to step (b), the first bridge portal sets remote_split_timeout fields of the timeout request message to values in accordance with the Hiperlan 2 IEEE 1394 SSCS 'SPLIT_TIMEOUT' register value of the first portal.

7. Method for facilitating data transmission over a network by determining a remote timeout parameter in a network comprising a link comprising the steps, at the level of a first bridge portal, upon solicitation to provide its timeout contribution for a response subaction associated with a request subaction, of:
   (a) determining whether a destination node of the response subaction is located on the link or not wherein the link represents a second bus between a first bus and a third bus, wherein the link is implemented throuah a first and a second bridge portal connected respectively to the first and the third bus, and wherein the link is modelized as a second bus connected to the first bus and the third bus through respective bridges;
   (b) if a destination node of the response subaction is located on the link representine the second bus, adding to the timeout contribution: the first bridge portal's maximum response subaction processing time and the link's maximum transmission time to establish the time delay for receiving a response from the destination node on the link representing the second bus, wherein the timeout represents the sum of time limits that each bridee on a route from a destination node to a requesting node is allotted to forward the response subaction, the requesting node being on the first bus, the destination node being on the link representing the second bus or on the third bus;
   (c) if a destination node of the response subaction is not located on the link representing the second bus, adding to the timeout contribution: the first bridge portal's maximum response subaction processing time and half of the link's maximum transmission time, and forwarding a timeout contribution message to the second bridge portal; and
   (d) deeming a data transmission attempt a failure if the request subaction does not occur within a time interval defined by the timeout contribution.

8. Method according to claim 7, wherein, further to step (c), the second bridge portal adds as its contribution its own maximum response subaction processing time and half of the link's maximum transmission time.

9. Method according to claim 7, wherein the link representing the second bus is a wireless Hiperlan 2 network.

10. Method according to claim 9, wherein the maximum transmission time of the wireless link representing the second bus is equal to half of the Hiperlan 2 IEEE 1394 SSCS 'SPLIT$_{13}$TIMEOUT' register value of a portal.

* * * * *